C. WALKER.
COMBINED STOP AND DRAIN VALVE.
APPLICATION FILED APR. 24, 1912.
1,053,075.
Patented Feb. 11, 1913.
3 SHEETS—SHEET 1.
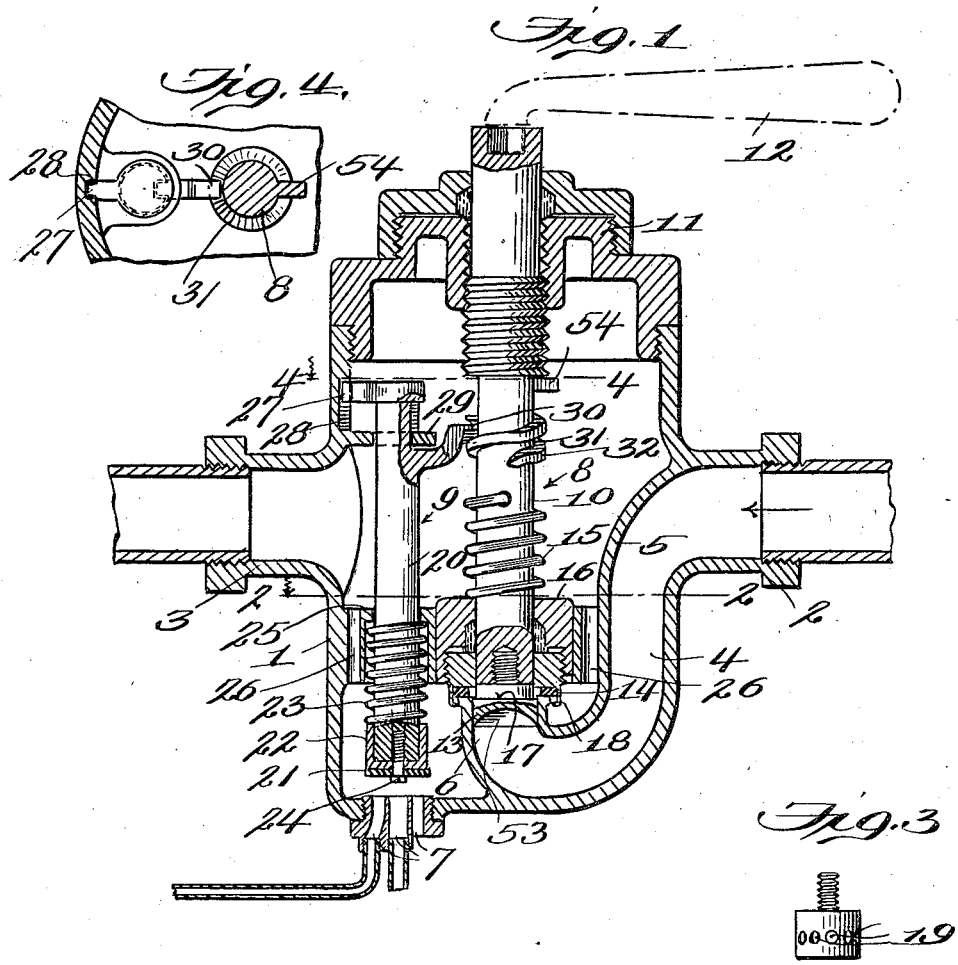
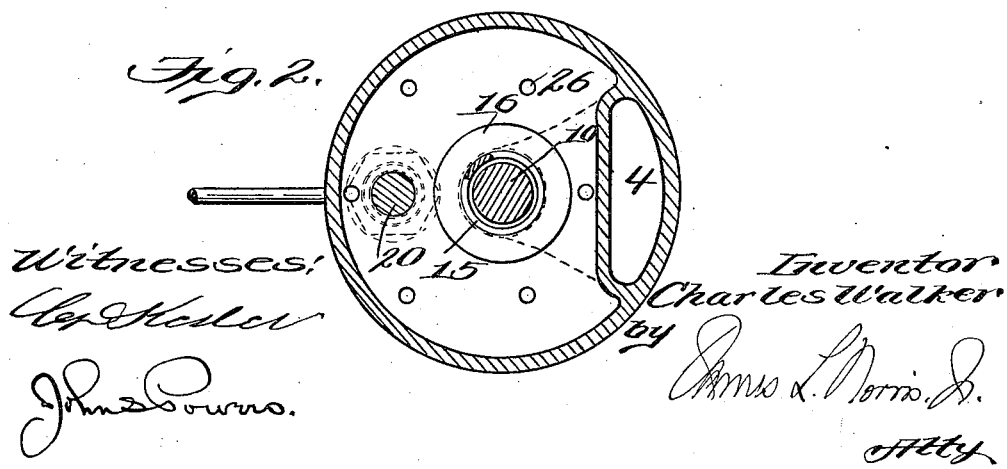
Witnesses:
Inventor
Charles Walker
by
James L. Morris
Atty C. WALKER.
COMBINED STOP AND DRAIN VALVE.
APPLICATION FILED APR. 24, 1912.
1,053,075.
Patented Feb. 11, 1913.
3 SHEETS—SHEET 2.
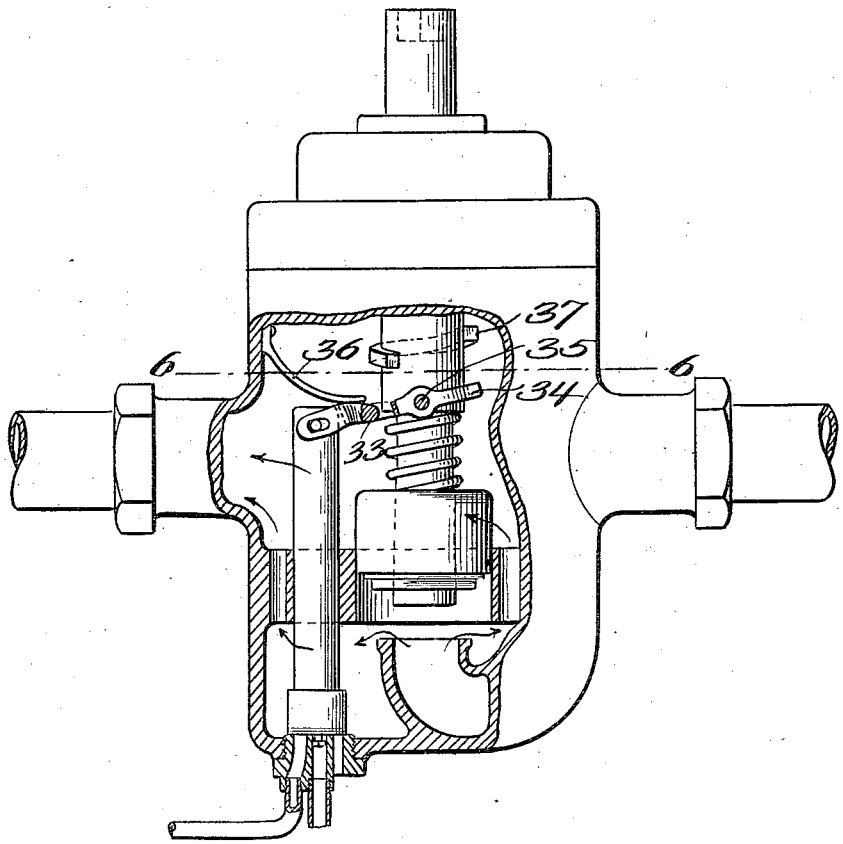
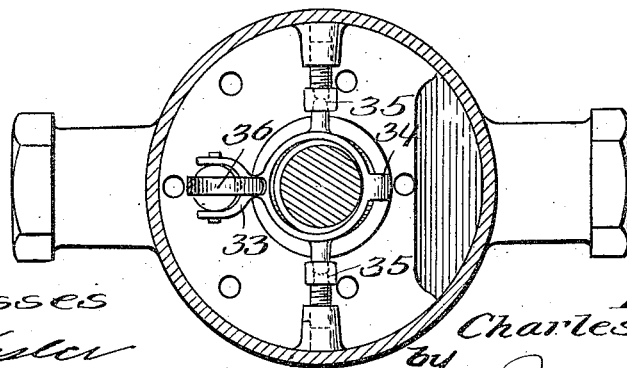
Witnesses
Inventor
Charles Walker
by
Atty.

C. WALKER.
COMBINED STOP AND DRAIN VALVE.
APPLICATION FILED APR. 24, 1912.
1,053,075.
Patented Feb. 11, 1913.
3 SHEETS—SHEET 3.
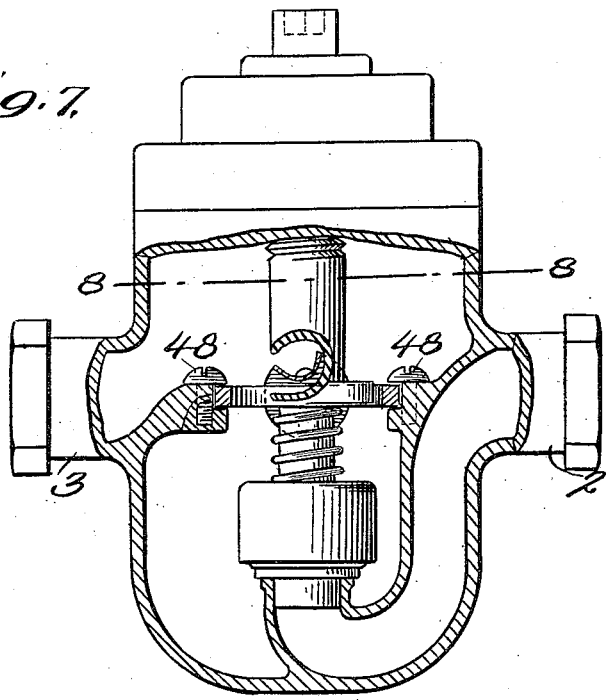
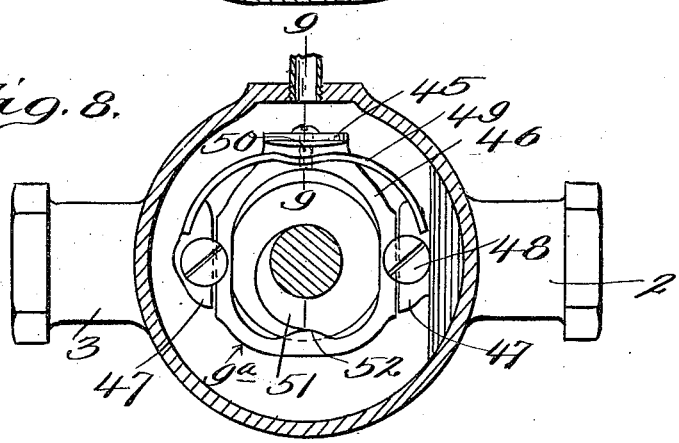
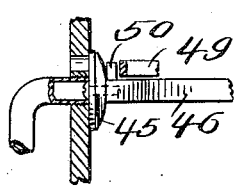
Inventor
Charles Walker

UNITED STATES PATENT OFFICE.

CHARLES WALKER, OF KNOXVILLE, TENNESSEE.

COMBINED STOP AND DRAIN VALVE.

1,053,075.   Specification of Letters Patent.   Patented Feb. 11, 1913.

Application filed April 24, 1912. Serial No. 692,894.

*To all whom it may concern:*

Be it known that I, CHARLES WALKER, a citizen of the United States, residing at Knoxville, in the county of Knox and State of Tennessee, have invented new and useful Improvements in Combined Stop and Drain Valves, of which the following is a specification.

This invention relates to improvements in combined compression stop and drain valves, of that type wherein two valve bodies are employed, the one controlling the circulation passages and the other controlling the drainage opening or openings.

The principal object of the present invention is to provide a valve of the class described in which the valve bodies are so constructed and coördinated that the access of water from the inlet opening to the drainage openings will be positively prevented. In carrying out this object, the invention provides for the complete and secure closure of the water inlet passage before the drain openings are uncovered and at the same time for the operative connection of the valve bodies aforesaid in such manner that one will be operated from the other in an especially facile manner and without any undue wear of the main valve.

Embodiments of the invention are illustrated in the accompanying drawings, in which:

Figure 1 is a central vertical sectional view of a valve construction in which the features of the invention are incorporated; Fig. 2 is a horizontal sectional view on the line 2—2 of Fig. 1; Fig. 3 is a view showing an alternative detail of construction pertaining to the valve body which controls the circulation passages; Fig. 4 is a horizontal sectional view on the line 4—4 of Fig. 1; Fig. 5 is a view similar to Fig. 1 but showing a modified or alternative construction; Fig. 6 is a horizontal sectional view on the line 6—6 of Fig. 5; Fig. 7 is a view similar to Fig. 1 but showing a further modified or alternative construction; Fig. 8 is a horizontal sectional view on the line 8—8 of Fig. 7; and Fig. 9 is a detail sectional view on the line 9—9 of Fig. 8.

Similar characters of reference designate corresponding parts throughout the several views.

The operating parts are inclosed in a valve casing 1 which has the inlet connection 2 and the outlet connection 3. In the embodiments shown, the connection 2 communicates with a passage 4, which is formed by a partition 5 and the wall of the casing adjoining said partition, and which extends downwardly from the inlet connection 2, terminating in an upwardly directed valve seating discharge end 6.

In the constructions shown in Figs. 1 to 6, the connections 2 and 3 are located opposite one another and the openings for drainage purposes are located in the bottom wall of the casing 1. These openings are shown at 7, and are preferably sufficient to provide an air vent, a force tube connection and a connection for the trapped pipes of the system, as explained in my prior U. S. Patent No. 965,129 of July 19, 1910. However, the number of drainage openings is unimportant, so far as the present invention is concerned; and if desired, but a single opening for drainage purposes may be provided. The discharge end 6 of the passage 4 is controlled by a valve designated generally by the numeral 8, and the drainage openings 7 are controlled by a valve designated generally by the numeral 9. The valve 8 includes a stem 10 which is threaded through a closure and packing head 11 at the upper end of the casing 1 and on its projecting outer end portion may carry or be connected to an operating handle 12. The stem 10 carries at its lower end an axial valve projection 13 of a diameter but very slightly less than the diameter of the discharge end 6 of the passage 3, and which is designed to pass axially into said passage. Above the projection 13 a valve washer 14 is arranged, the office of which is to seat upon the annular face of the discharge passage 6 and act in connection with the valve projection 13 in completely cutting off the flow of water from the passage 4. The washer 14 is forcibly held in seated relation by an expansive coil spring 15 which surrounds the stem 10, having an end secured thereto and an end which bears against a follower 16, also surrounding the stem 10 and arranged above the washer 14. It is desired that the washer 14 should remain seated even during a portion of the upward movement of the stem 10 and for this purpose, the follower 16 is slidable on the stem 10, its downward movement being limited by a shoulder 17 on the projection 13. The follower 16 preferably comprises a pair of members which are connected by threads, the object being to adjust the height of the follower and thereby regulate the tension of the spring 15. The washer 14 is preferably inclosed within an angular flange-like extension 18 of the follower 16. In the construction shown in Fig. 1, the valve projection 13 is designed to be wholly retracted from the discharge opening 6. In Fig. 3, however, a valve projection is shown which need not be withdrawn from the passage 6, being provided with an annular row of openings 19 through which the water passes from the inlet passage 4, and being of substantially greater depth than the projection 13 shown in Fig. 1.

The valve 9 includes a stem 20 which, in the embodiment shown in Figs. 1 to 6, is parallel to the stem 10 of the valve 8. The stem 20 carries at its lower end a valve disk 21 and a follower 22 which is urged against the disk by an expansive coil spring 23. The disk 21 and the follower 22 are mounted loosely on an axially projecting retaining pin 24, which is secured in the lower end of the stem 20, and the spring 23 is seated in a recess in a horizontal web 25 which extends across the casing above the discharge end 6 of the passage 4, and serves as a guide for the follower 16 and for the valve stem 20. The web 25 is provided with a suitable number of openings 26 through which water may circulate from the portion of the casing at one side of said web, to the portion of the casing at the other side of said web.

In the embodiment shown in Fig. 1, the valve stem 20 is held against turning movement by a lug 27 at the upper end thereof, and which engages in a groove 28 formed in the casing, the upper portion of the stem 20 passing through a centering lug 29 which is formed within the casing. The valves 8 and 9 are put into operative relation by the provision of a lug 30 which projects laterally from the stem 20 and works in a spiral groove 31, defined by a projecting spiral rib 32 formed on the stem 10. The pitch of the rib 32, and consequently, of the groove 31, is considerably greater than the pitch of the threads on the upper portion of the stem 10, and which work through the head 11, in order that, during the downward movement of the stem 10 the rib 32 and the groove 31 may effect an upward movement of the stem 20.

The lug 30, the groove 31, and the rib 32 are to be regarded simply as one means of coördinating the valves 8 and 9. Various other means may be employed, some of which are herein illustrated, and will now be referred to. Thus, in Fig. 5, the construction of the valve is generally the same as in Fig. 1, differing, however, as to the manner of relating the valves 8 and 9. In this latter construction, the upper portion of the stem 20 is pivotally connected to the forked end of a lever 33. The other end of the lever 33 is of annular form, as at 34, and loosely surrounds the stem 10, being pivoted at opposite sides thereof, as at 35, and in line with a transverse diameter of the stem 10. The valve 9 is maintained in seated relation preferably by a leaf spring 36, which bears against the lever 33, and is opened against the tension of said spring by a spiral cam 37, provided on the stem 10 to engage the portion 34 of the lever 33 which surrounds said stem.

The construction shown in Figs. 7 to 9 proceeds on the same principles as the constructions already described, but differs substantially as to the arrangement of the parts. In this case, the drainage opening or openings, instead of being formed in the base of the casing 1, as in the preceding examples, are formed in a side thereof and between the connections 2 and 3. The passage 4, with its upturned discharge end 6, is controlled by a valve 8 which may be of the same construction as the valve 8 referred to in connection with Fig. 1, and the drainage openings are controlled by a valve which is designated generally by the character 9ª and corresponds to the valve 9 in the preceding examples. The valve 9ª includes a valve washer 45 which is mounted on a sliding frame 46. The frame 46 surrounds the stem of the valve 8 and is movable transverse to the casing 1, being supported by ledges 47 arranged adjacent the connections 2 and 3. Screws 48 are threaded into the ledges 47, their heads overlying the sides of the frame 47 and preventing any upward displacement of said frame. The valve disk 45 is urged to closed position, for example, by a leaf spring 49, the ends of which may be suitably secured to the ledges 47 and the central portion of which engages an upstanding pin 50, provided on the frame 46. The stem 10 of the valve 8 in this instance carries a cam 51 which is shaped to move the frame 46 against the tension of the spring 49, and which preferably engages an inwardly extending leg or rise 52 of the frame 46. The sides of the frame 46 are preferably straight and parallel, in order that they may be efficiently supported and guided by the ledges 47.

All of the constructions above referred to operate on practically the same principles and provide for the complete closure of the passage 4 prior to the opening of the valve 9, and for the complete closure of the openings 7 prior to the opening of the passage 4. Thus, in Fig. 1, the valve 8 is shown as closed, and the valve 9 as open, in which case the circulation of water from the connection 2 to the connection 3 is interrupted, and the water remaining in the system will drain through the openings provided for this purpose. When the passage 4 is opened, the connections between the stems of the valves 8 and 9 will quickly close the valve 9 before the projection 13 and the washer 14 leave the valve seat 6. This action is secured by reason not only of the character of the connections between the valves 8 and 9, but by reason of the fact that the stem 10 of the valve 8 is permitted some degree of upward movement during which the projection 13 still remains within the passage 6, and before the shoulder 17 of said projection engages the follower 16 to lift the valve washer 14 from the face of the discharge terminal 6. Conversely, when the valve 8 is closed, the projection 13 enters the discharge end 6 of the passage 4, and the washer 14 assumes its seat before the valve 9 is opened. In this way the passage of water from the connection 2 to the drainage openings is absolutely prevented, yet at the same time, the proper sequence of operations of the valves 8 and 9 is secured. The valve construction shown in Figs. 5 and 7 carry out the same sequence of operations, involving, as they do, the quick acting connections between the valves 8 and 9, and the peculiar relation of the valve stem 10 and its projection 13 to the discharge end 6 of the passage 4, and to the valve washer 14.

The projection 13, regardless of the particular construction in which it may be employed, preferably has a dished or concave under face 53 (Fig. 1) which affords an annular relatively sharp edge that serves to cut away any deposit which may have accumulated in the discharge end 6 of the passage 4. The accurate seating of the valve is thus greatly facilitated. The seating of the valve is, moreover, not substantially affected by the water pressure, inasmuch as the projection 13 takes such pressure from the valve washer 14, and enables the latter to be held firmly against the under face of the part 6, and under the pressure of the spring 15. If desired, the stem 10 of the valve 8 may carry a projection 54 to engage the head 11, and limit the upward movement of the valve 8, or any other device suitable for the purpose may be employed.

The valve construction herein described has the further advantage of being compact and of being adaptable to various environments wherein economy of space and an accurate relation of the operations involved are required.

It is to be understood that the constructions herein disclosed are to be regarded by way of example, rather than by way of enumeration.

Having fully described my invention, I claim:

1. In a compression stop and drain valve construction, a casing having an inlet connection and a drainage opening, a pair of valves for said connection and opening respectively, operative connections between the valves, the valve which controls the drainage opening being operable to open subsequent and to close prior to the corresponding closing and opening operations of the other valve, the latter comprehending a movable stem and spring pressed valve means carried thereby and relatively movable thereon, and a threaded connection between said movable stem and the head of the valve casing.

2. In a compression stop and drain valve construction, a casing having an inlet connection and a drainage opening, a pair of valves for said connection and opening respectively, operative connections between the valves, the valve which controls the drainage opening being operable to open subsequent and to close prior to the corresponding closing and opening operations of the other valve, the latter comprehending a movable stem and spring pressed valve means carried thereby and relatively movable thereon, the stem having a shouldered projection below the valve means and adapted to work in the discharge end of the inlet connection, and a threaded connection between said movable stem and the head of the valve casing.

3. In a compression stop and drain valve construction, a casing having an inlet connection and a drainage opening, a pair of slidable valves for said connection and opening respectively, a cam-like element associated with one valve and a companion element associated with the other valve for engagement by said cam-like element, said elements constituting a means of connection between the valves whereby when the stop valve is opened and closed relatively quick prior closing and subsequent opening operations of the drain valve will be effected, the valve which controls the inlet connection comprising a movable stem threaded through the head of the casing, and a spring-pressed valve body movable relatively on said stem.

4. In a compression stop and drain valve construction, a casing having an inlet connection and a drainage opening, said connection and opening being located adjacent the lower end of the casing, a pair of parallel valves for said connection and opening respectively, a quick acting operative connection between the valves whereby the valve which controls the drainage opening is operable to open subsequent and to close prior to the corresponding closing and opening operations of the other valve, the latter comprehending a movable stem and spring pressed valve means carried thereby and relatively movable thereon, and a threaded connection between said movable stem and the head of the valve casing.

5. In a compression stop and drain valve construction, a casing having an inlet connection and a drainage opening, said connection and opening being located adjacent the lower end of the casing, a pair of parallel valves for said connection and opening respectively, the valve which controls the connection including a threaded axially movable and rotatable stem and spring pressed valve means relatively movable in the lower portion of said stem and a quick acting connection between the valves comprising a spiral element on one of the valve stems and an element connected to the other valve stem for operative engagement by said spiral element.

In testimony whereof I have hereunto set my hand in presence of two subscribing witnesses.

CHARLES WALKER.

Witnesses:
CHAS. W. PARKER,
PARIS A. HAYNES.